United States Patent [19]

Downs et al.

[11] 3,995,006

[45] Nov. 30, 1976

[54] SULPHUR DIOXIDE ABSORPTION SYSTEM

[75] Inventors: William Downs, Alliance; Alan J. Kubasco, Akron, both of Ohio

[73] Assignee: The Babcock & Wilcox Company, New York, N.Y.

[22] Filed: Mar. 20, 1975

[21] Appl. No.: 560,071

Related U.S. Application Data

[63] Continuation of Ser. No. 348,384, April 5, 1973, abandoned.

[52] U.S. Cl. .............................. 423/242; 423/244; 423/512 A
[51] Int. Cl.² ..................................... C01B 17/00
[58] Field of Search ............... 423/242, 244, 512 A, 423/637, 638; 210/512 R

[56] References Cited
UNITED STATES PATENTS

| 2,080,779 | 5/1937 | Lessing | 423/242 |
| 3,708,266 | 1/1973 | Gustavsson | 423/242 |

OTHER PUBLICATIONS

Chemical Engineers' Handbook–Perry–4th Ed.–1963 pp. 21-54.

Primary Examiner—Oscar R. Vertiz
Assistant Examiner—Eugene T. Wheelock
Attorney, Agent, or Firm—Joseph M. Maguire; Vincent M. Fazzari; Earl A. Mosley

[57] ABSTRACT

A system for improving the absorption of gaseous $SO_2$ contained in flue gases by contact with an absorbing slurry, separating the unreacted solids from the reacted solids in the slurry product of the absorption in an inertial separator and recycling the unreacted solid containing slurry to the $SO_2$ absorption system.

4 Claims, 4 Drawing Figures

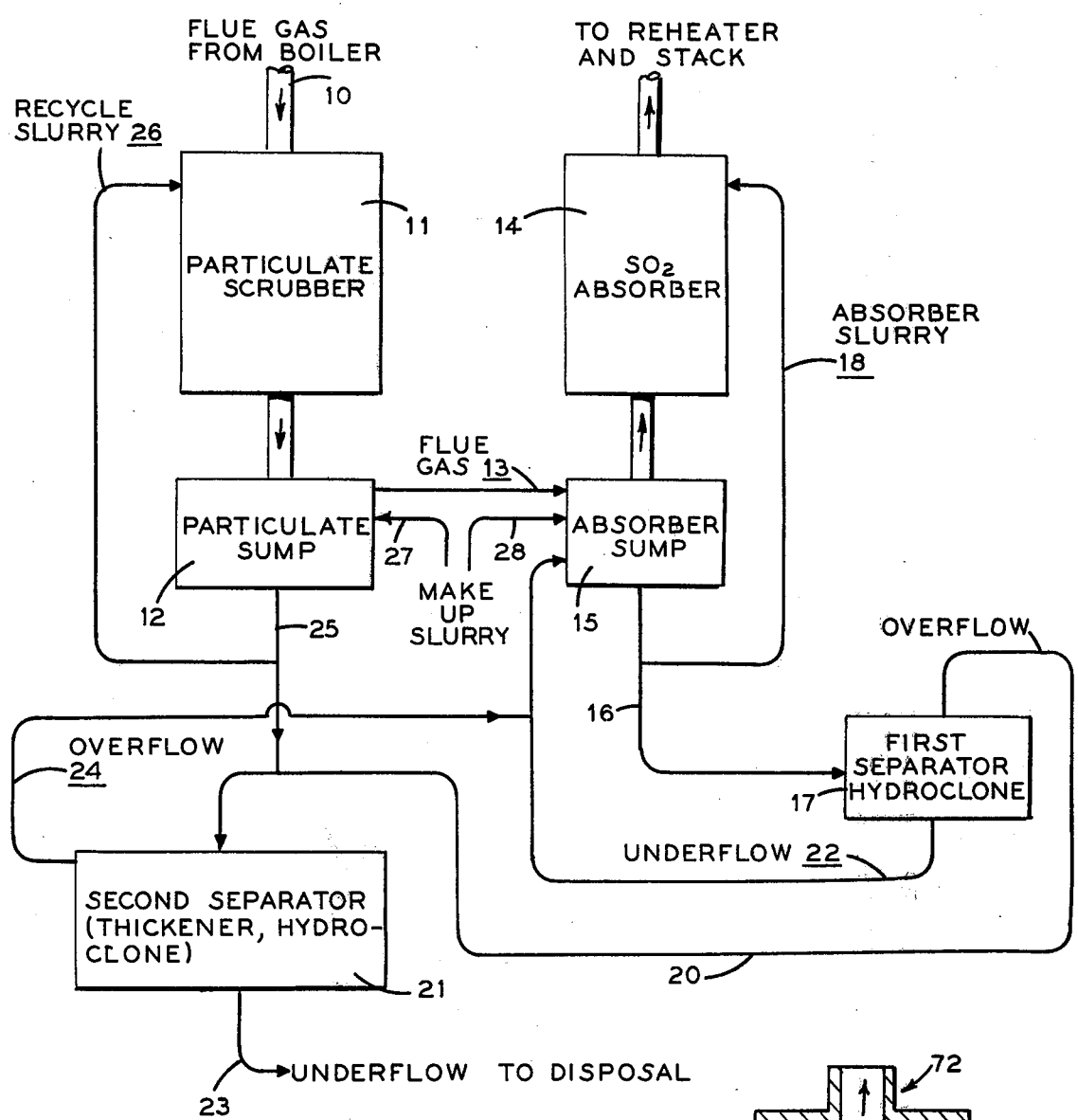
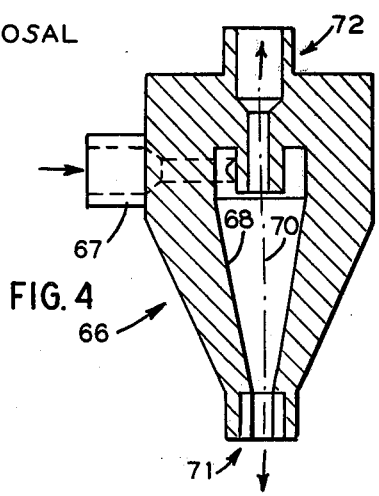

SULPHUR DIOXIDE ABSORPTION SYSTEM

This is a continuation of application Ser. No. 348,384, filed Apr. 5, 1973, now abandoned.

The present invention relates to a method of and an apparatus for the removal of sulphur oxides from flue gases, and more particularly, the utilization of limestone in the absorption of sulphur oxides from flue gases.

In the removal of gaseous sulphur oxides from flue gases resulting during the combustion of sulphur containing fuels, many wet and/or dry systems have been proposed and some have been used with varying degrees of success. Limestone slurry has proven to be an effective sulphur dioxide absorbent material. Unfortuantely, the resultant product of the limestone system consists of large quantities of unused calcium carbonate, sulphites and sulphates. The liquid effluent discharged from a limestone system may be dewatered with the water reused for further absorption of the gaseous sulphur oxides in flue gas, but the solids constitute a problem in disposal. The magnitude of the disposal problem in an electric utility plant can be appreciated when it is understood that the limestone slurry when supplied at stoichiometric rates requires typically about 5 tons of limestone per hour for a 100 megawatt utility plant, and it is necessary to supply limestone in excess of stoichiometric rates for effective sulphur oxide removal from the flue gases. The disposal of perhaps 7½tons per hour of solids containing unreacted calcium carbonate, and reaction products of calcium sulphate and calcium sulphite for each 100 MW of capacity constitutes a major problem.

In our present invention we have found that an appreciable percentage of the unreacted $CaCO_3$ in the spent slurry can be reclaimed for reuse in the sulphur oxide absorption process with an appreciable reduction in the disposal problem. Ordinarily, the spent slurry leaving the absorption system contains as principal elements calcium carbonate and calcium sulphite. The sulphite will normally be in the form of crystals which are substantially smaller than the particles of calcium carbonate. The relative size difference between calcium carbonate and calcium sulfite in the spent slurry is due to two factors. First, the crystal structure of calcium sulfite is in the form of thin broad platelets which, in the fluid force fields behave like small spherical particles. In addition, the pulverized limestone which is more or less spherical exists in the fresh makeup limestone in a broad distribution of particle sizes. It is the nature of the sulfur dioxide absorption system that the smallest limestone particles will react preferentially to form calcium sulfite. Thus, only the larger limestone particles remain in the spent slurry. Here particle size refers to the equivalent Stokes diameter. While the specific gravities of the two particulates are similar, the size difference permits reasonably good separation by inertial or centrifugal forces, in for example a hydroclone, so that an economical separation between calcium sulphite and calcium carbonate may be obtained. Under these conditions, the reclaimed calcium carbonate can be returned to the absorption system while the calcium sulphite containing portion of the spent slurry will be passed to disposal. Recycling the carbonate reduces the quantity of make-up added to the absorption system, lowering the quantity of limestone which must be pulverized and also reduces the weight (and volume) discarded.

Of the drawings,

FIG. 1 is a schematic diagram of a wet scrubber arranged in accordance with the invention for removal of particulate matter and sulphur oxides from flue gases;

FIG. 4 is a schematic showing of a typical hydroclone useable in the present invention.

Figure 2:
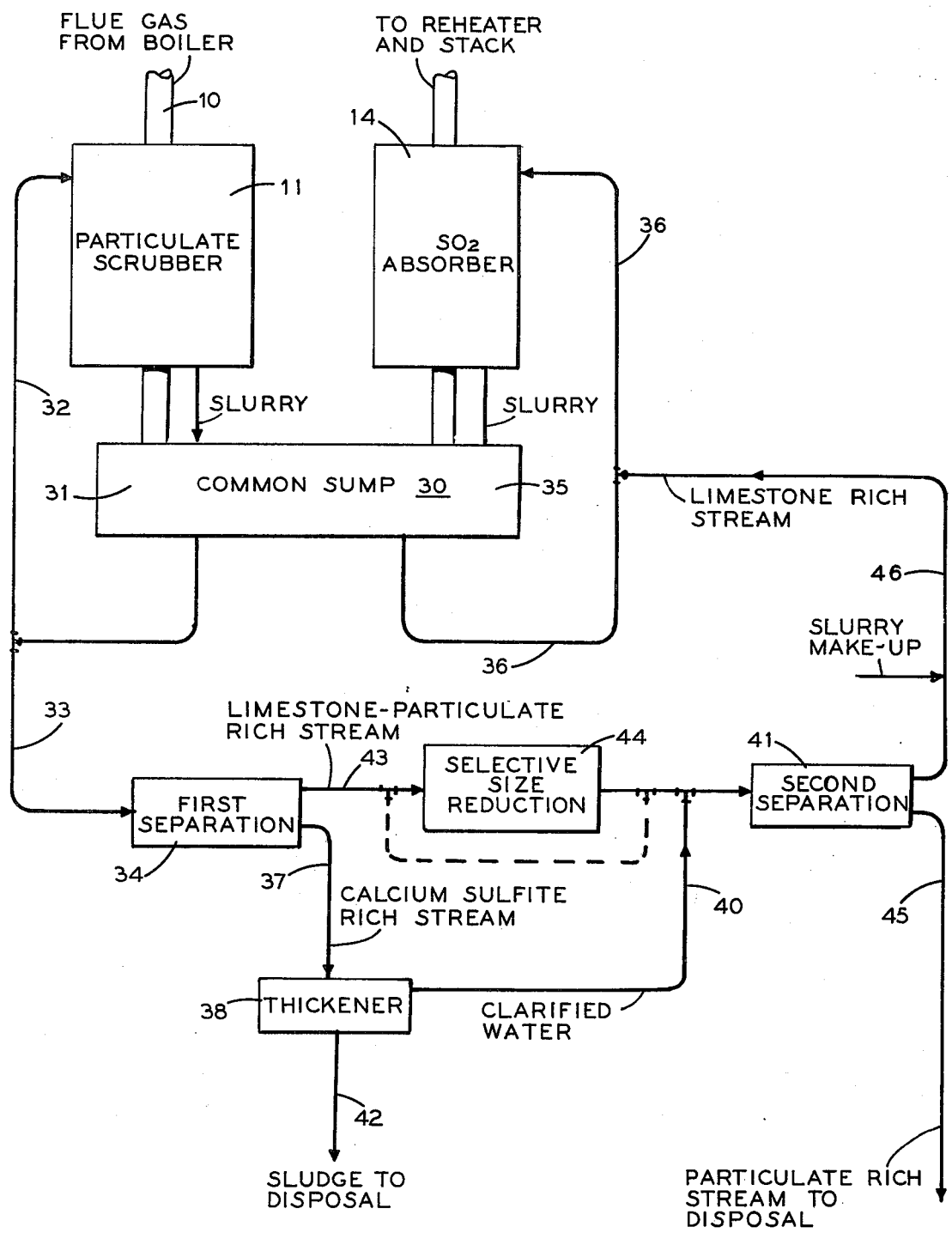
FIG. 2 is a schematic diagram of wet scrubber showing an alternate arrangement according to the invention.

In the treatment of flue gases resulting from the combustion of sulphur containing fuels, the systems required for the absorption of the gaseous sulphur oxides from the flue gases will differ depending upon the original fuel. For example, when burning a solid fuel which contains ash as for example bituminous coal, it may be desirable to remove the particulate ash from the flue gases before absorption of the sulphur oxides. Furthermore, several different forms of particulate ash removal can be used. When dry particulate ash removal is used, as by an electrostatic precipitator, the ash need not mingle with the sulphur oxide absorption liquid. On the other hand, when a wet particulate ash removal system is used, the ash removed from the flue gas can be essentially separated from the $SO_2$ abosrption system, or the effluent from both can be mingled.

In the example of construction and arrangement of the invention shown in FIG. 1, flue gases from the combustion of a solid, ash containing fuel, such as bituminous coal, is passed sequentially through a wet scrubber and the wet absorber. As hereinafter described the liquid effluent from the wet scrubber and the wet absorber are essentially separate and are separately treated.

As shown, flue gases from a power boiler (not shown) pass through a flue duct 10 to a wet scrubber 11 where the gases are impacted by a spray of liquid to agglomate the particulate ash in the gases. The solids, liquids, and gas is are thereafter subjected to gravitational and/or centrifugal forces for removal of solids and liquids from the gas stream. Many known types of wet scrubbers and separators may be used although we prefer to use a venturi-like unit for mixing and subsequent efficient separation of solids from the flue gases. The separated solids and liquids form a slurry and are collected in a sump 12, while the substantially dust-free flue gases pass through a duct 13 to an abbsorber 14 via sump 15.

In the absorber 14 the gases are intimately contacted by a limestone containing slurry to absorb $SO_2$ from the gases before discharge of gases to the atmosphere. The slurry with absorbed $SO_2$ is collected in a sump 15 with slurry discharged through pipe 16 to a separator 17. A controlled flow of slurry from pipe 16 is passed through branch pipe 18 to the upper portion of the absorber 14 to supply the material for absorption of $SO_2$ from the flue gases passing therethrough.

The classifying separator 17 is intended to effect separation between the small and relatively larger particulate materials in the slurry delivered thereto. A classifier separator of the hydroclone type is reasonably useful for this purpose, since centrifugal forces tend to cause the larger particulate matter to pass through the underflow and the finer particulate matter to pass through the overflow. It has been observed that the overflow contains a high percentage of calcium sulphite and so the materials in the overflow can be passed to discard or, as shown, through a pipe 20 to a second separator 21. The underflow will have a high percentage of unreacted calcium carbonate, and will be returned to the absorber sump 15 through pipe 22 from the underflow of the separator 17.

In the embodiment shown, the separator 21 is a thickener intended to pass solids through an underflow pipe 23 in thick liquid form to disposal which may take the form of settling tanks or the like, while the overflow of liquid is passed through a pipe 24 to join pipe 22 for discharge to the sump 15. It will be understood a second hydroclone may be inserted in the pipe 22, with the overflow passing to the thickener 21 and the underflow returned to the sump 15. Such hydroclone would further separate smaller calcium sulphite crystals from the larger unreacted calcium carbonate particles so that the latter could be recycled to the absorber 14 via sump 15.

The solids and liquids accumulated in the particulate sump 12 are passed through pipe 25 to the thickener 21 with a branch pipe 26 passing a regulated quantity of the slurry to the spray nozzles of the scrubber 11. It will be noted the scrubbing slurry passed through the pipes 25 nd 26 is separate from the slurry passed through the pipe 22, with the slurries combined only in the separator 21. With this arrangement ash particles collected in the particulate scrubber slurry will not affect the absorption slurry utilized in the absorber 14.

Since some water and some limestone will be lost to the system, make-up limestone slurry could be added to the system through pipes 27 and 28.

In the embodiment of the invention shown in FIG. 2, the flue gases from the boiler (not shown) are passed through a duct 10 to a particulate scrubber 11 and an $SO_2$ absorber 14 as in the FIG. 1 version. However, as shown, the separate scrubbing elements 11 and 14 are provided with a common sump 30. The liquid discharged gravitationally from the particulate scrubber and the absorber accumulate in the common sump 30 with liquid and entrained solids from the scrubber end 31 of the sump 30 recirculated for scrubbing purposes through pipe 32 to the scrubber 11 while a minor portion of the liquid with entrained solids is passed through pipe 33 to first separator 34.

Some of the liquid with entrained solids from the common sump is recirculated from the absorber end 35 through a pipe 36 to the $SO_2$ absorber 14 with the excess of liquid from both scrubber 11 and abosrber 14 flowing through the pipe 33 to the first separator 34.

In accordance with the invention, the first separator 34 or separation zone is formed as an inertial separator, such as a hydroclone. In the separator 34 the calcium sulphite solids, being of smaller size than the limestone, and particulate matter in the entering stream will be discharged through a pipe 37 to a thickener 38. From the thickener 38 clarified water will be passed through a pipe 40 to a separate second separator 41, with the sludge sent to disposal through a pipe 42. The coarser limestone and particulate matter such as ash and other incombustibles will pass from the separator 34 through pipe 43 to a comminuter or pulverizer 44. Ordinarily, the limestone and particulate matter will be passed as a slurry to a wet grinding ball-mill pulverizer where the difference in hardness of the limestone and particulate matter will permit selective size reduction. It will be noted that, generally speaking, the specific gravity of the particulate matter and the limestone will be substantially equal, but since the limestone is softer, its size will be selectively reduced whereas the particulate matter will not be substantially reduced in size.

By reason of the selective size reduction, the slurry leaving the ball-mill may be passed to the second separator 41 where the particulate matter will be separately rejected for passage through pipe 45 to disposal, and the limestone rich portion of the slurry will be passed through pipe 46 to the recirculation line of pipe 36 delivering absorbent to the $SO_2$ absorber.

With this arrangement, it is possible to selectively reject calcium sulphite and the particulate matter reclaimed form the flue gases produced by the combustion of bituminous coal and, at the same time, return calcium carbonate to the system for absorption of $SO_2$ from the flue gases. This procedure minimizes the quantity of rejects from the absorption system passed to disposal.

Figure 3:
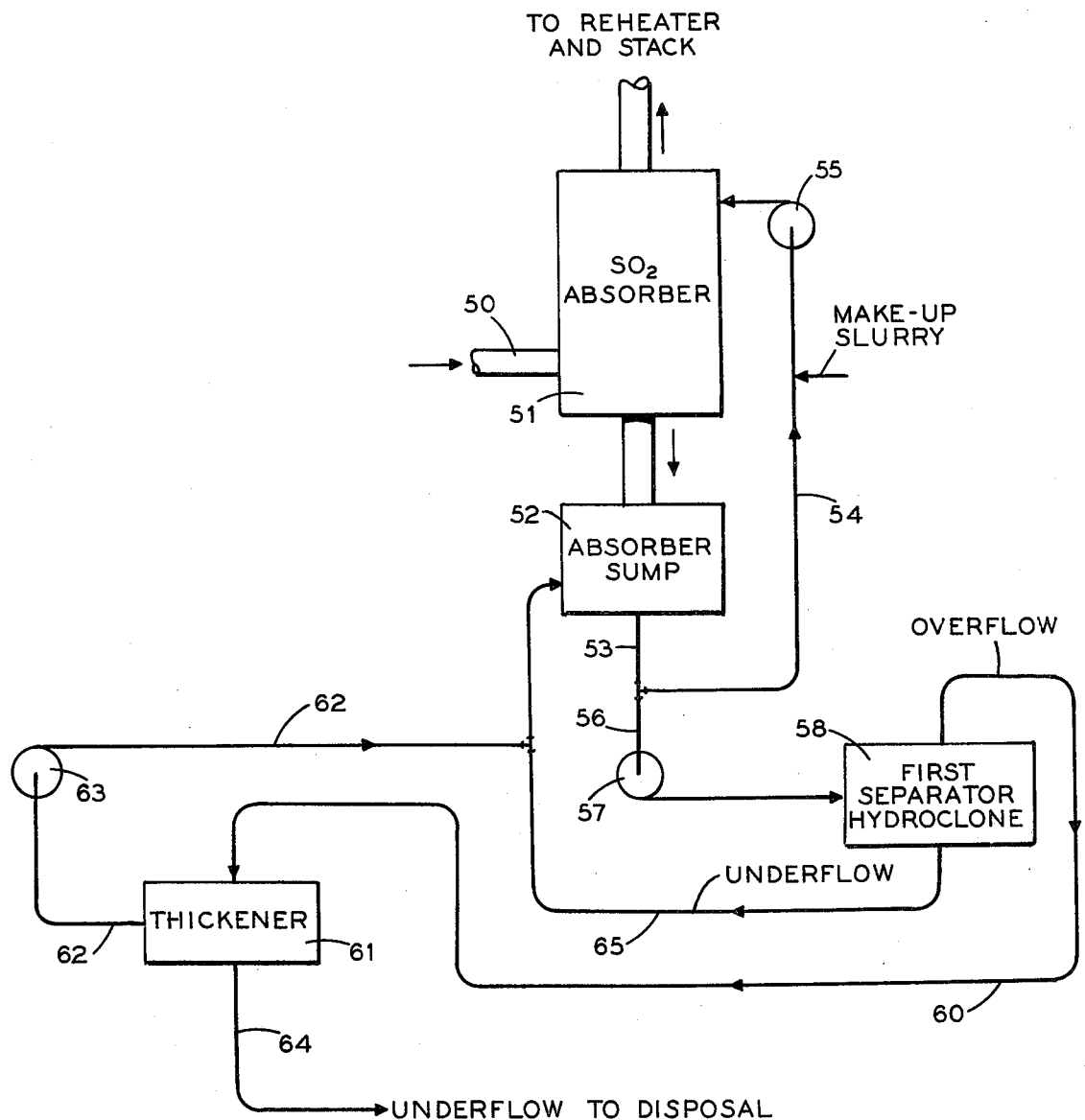
FIG. 3 is a schematic diagram of a wet scrubber showing a further alternative arrangement according to the invention.

In the embodiment of the invention shown in FIG. 3, the flue gases may either originate in a coal or oil fired unit. If coal is the fuel, the flue gases may be passed through an electrostatic precipitator (not shown) to remove the entrained solid material, or if the fuel is oil, it need not be necessary to remove entrained solids from the flue gases. In FIG. 3, the gases entering the $SO_2$ absorber through duct 50 will be substantially free from entrained solid matter. In the arrangement shown, limestone slurry is sprayed into the absorption tower 51 to remove $SO_2$ from the flue gases with the liquid effluent passed through an absorber sump 52. The sump 52 is provided with a discharge pipe 53 which is connected through a pipe 54 with a pump 55 for recirculation of liquid to the absorber 51 and is further provided with a branch pipe 56 and a pump 57 whereby a portion of the liquid effluent is directed to to a separator 58 of the inertial type, such as a hydroclone. The overflow from the separator 58 is directed through a pipe 60 to a thickener 61 with the clarified liquid therefrom discharged through a pipe 62 and pump 63 to the absorption sump 52, and the solids passed through pipe 54 to disposal. The underflow from the hydroclone, which contains a major portion of the unreacted calcium carbonate, is also passed through a pipe 65 to the absorber sump 52.

In the disclosure of FIGS. 1, 2 and 3, reference is made to an inertial separator. A good example of such a separator would be a hydroclone 66 (such as shown schematically in FIG. 4). In FIG. 4, the slurry containing calcium carbonate, calcium sulfite and other particulate matter is delivered tangentially into the upper portion of the hydroclone 66 through a duct 67. Since the hydroclone uses centrifugal force to separate various particulate-size solids in the incoming slurry, the tangential introduction causes the slurry to spin very rapidly, creating a force on the particles many times that of gravity. The larger particles, assuming nearly equal density for all particles, are thrown out to the wall 68 of the hydroclone while the smaller particles are displaced and thus move toward the axis 70. The larger particles spiral downwardly toward the apex 71 at the lower end of the hydroclone where they are discharged in what is usually called the underflow. The smaller particles move upwardly from the central portion of the hydroclone and discharge from the top 72 of the hydroclone in what is usually termed the overflow.

There are several procedures possibles in dividing the slurry stream entering the hydroclone, as for example, by providing restricted outlets to either or both of the underflow and overflow streams. In general, we have found it desirable to maintain a substantially equal division of slurry discharging through the underflow and overflow. The effect of such an arrangement is to generally divide the slurry flow equally. However, we have found that since the calcium sulfite crystals are generally smaller than the calcium carbonate particles, a larger proportion of the calcium sulfite crystals will discharge with the overflow, i.e., from the top 72.

Test work has indicated that the underflow will contain a major portion of the total calcium carbonate present in the slurry delivered to the hydroclone and, at the same time, a major proportion of the calcium sulfite crystals will be discharged through the overflow. While the hydroclone does not give a perfect separation between the two solid materials, nevertheless the efficiency of separation is sufficient to justify the use of the hydroclone to reduce the discharge of solid materials sent to disposal.

When fly-ash is present in the slurry, it has been found that the fly-ash will have a tendency to be present in the underflow slurry with the calcium carbonate. It is for this reason that the arrangement shown in FIG. 2 includes a pulverizer through which the mixture of fly-ash and calcium carbonate is passed from the underflow of the first hydroclone. We have found that pulverization of this slurry selectively reduces the size of the calcium carbonate since this material is substantially of a higher grindability than the fly-ash. Thus, the product from the pulverizer may be passed through a second hydroclone for reasonably effective separation between the finer calcium carbonate particles and the larger fly-ash particles.

What is claimed is:

1. In a method for the absorption of gaseous sulphur oxides from flue gases using a reactive absorbent limestone containing slurry wherein the flue gas is contacted with the absorbent slurry to convert at least some calcium carbonate to calcium sulphite in the slurry, a portion of the absorbent being recycled to contact the gas, the improvement comprising:

subjecting the slurry containing undissolved calcium carbonate and undissolved calcium sulphite to a centrifugal classifying step with the slurry being separated into an overflow discharge stream containing a major portion of the calcium sulphite with a minor portion of the calcium carbonate and an underflow slurry stream containing a major portion of the calcium carbonate and a minor portion of the calcium sulphite, removing the overflow discharge stream from the classifying step and recirculating the underflow discharge stream to contact with the flue gases.

2. In the improved method as in claim 1, wherein the overflow discharge stream is subjected to a second classification step to further separate any calcium carbonate from the calcium sulphite.

3. In the improved method as in claim 2, wherein at least one of the classification steps is a centrifugal classification step.

4. In the improved method as in claim 3, wherein the slurry stream from the first classifier which contains the majority of the calcium carbonate also contains ash, selectively pulverizing the slurry stream to pulverize the calcium carbonate, before subjecting the slurry to the second classification step.

* * * * *